United States Patent [19]

Ward

[11] 3,837,822

[45] Sept. 24, 1974

[54] TWO-STAGE COUNTERCURRENT FLUID-SOLID CONTACTING PROCESS

[75] Inventor: Dennis J. Ward, Barrington, Ill.

[73] Assignee: Universal Oil Products Company, Des Plaines, Ill.

[22] Filed: Sept. 28, 1972

[21] Appl. No.: 293,246

[52] U.S. Cl. ............... 48/214, 23/288 R, 23/288 G, 48/197 R
[51] Int. Cl. ........................................... C10g 35/10
[58] Field of Search.......... 48/197 R, 213, 214, 215, 48/94, 105; 23/288 D, 288 G, 288 S; 252/418; 208/65, 139, 140, 165, 175

[56] References Cited
UNITED STATES PATENTS

| | | | |
|---|---|---|---|
| 3,647,680 | 3/1972 | Greenwood et al. | 208/65 |
| 3,652,231 | 3/1972 | Greenwood et al. | 208/140 X |

*Primary Examiner*—S. Leon Bashore
*Assistant Examiner*—Richard Pace
*Attorney, Agent, or Firm*—James R. Hoatson, Jr.; Robert W. Erickson; William H. Page, II

[57] ABSTRACT

An upflow fluid-solid contacting process in which the overall flow of solid particles is in a downward direction while the overall flow of fluids contacting the solids is in an upflow direction. The process specifically is defined as a two-stage fluid-solid contacting process in which fresh solids are added to a contacting zone at a top portion of the zone with spent solid particles removed from a lower section of the contacting zone. In the lower section of the contacting zone there is introduced a first fluid stream which passes in a countercurrent manner and in an upflow direction through the lower section. The effluent from that zone meets with a second feed fluid and passes into an upper section of the contacting zone. The processing flow in the upper section of the contacting zone is in an essentially lateral direction normal to the overall fluid flow in the lower section. More specifically, the fluid flow in the upper section is into a radial flow contacting zone where upon the fluids contact descending solids by passing in a horizontal manner to an outer shell and out of the upper section.

The process flow is applicable to general fluid-solid contacting processes and fluid-solid conversion processes such as hydrocracking or naphtha cracking to substitute natural gas products.

2 Claims, 1 Drawing Figure

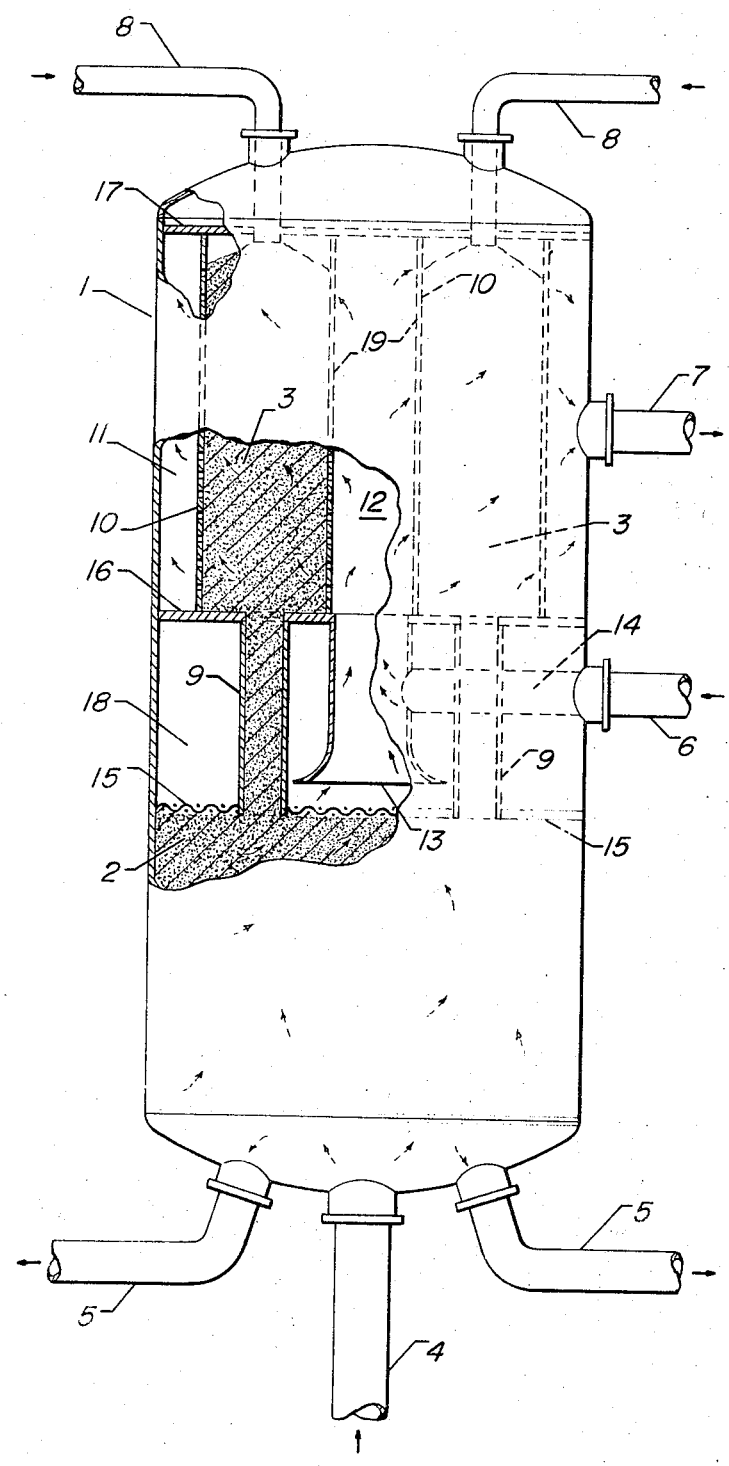

TWO-STAGE COUNTERCURRENT FLUID-SOLID CONTACTING PROCESS

BACKGROUND OF THE INVENTION

1. Field of the Invention

The field of art to which my invention pertains is countercurrent fluid-solid contacting processing. More specifically, my process relates to a fluid-solid contacting or conversion process in which an overall countercurrent flow is maintained in the lower section of the contacting process with lateral fluid-solid contacting operations taking place in an upper section in the contacting process in which fluid flowing in a horizontal direction contacts downfalling solid particles.

2. Description of the Prior Art

The most relevant prior art is U.S. Pat. No. 3,647,680 having as its inventors A. R. Greenwood and K. D. Vesely which issued on Mar. 7, 1972, and is found in U.S. classification 208-65.

That patent claims and discloses a continuous reforming-regeneration process utilizing radial flow configurations for a cocurrent passage of catalyst and reactant mixtures through stacked reaction zones. That patent does not, however, recognize the use of a countercurrent flow moving bed fluid-solid contacting process and does not recognize the problems associated with countercurrent flow moving bed processes which my invention now overcomes.

The basic problem in countercurrent processing, especially in processing which relatively small solid particles are used is that the linear velocity of the reactant or effluent gases passing in upflow direction may approach the incipient fluidization velocity of the particles in the fluid-solid contacting zone. At this point, a host of problems may occur. One of the problems is the forces acting on the particles cause them to move in an upward direction thereby preventing the downward passage of particles into the contacting zone. Another problem associated with the fluidization of particles is that they may be unduly reduced in size by excessive contact with each other or equipment. Another problem occurs in countercurrent flow processes such as substitute natural gas production, hydrocracking or any other type process such as styrene production from aromatics, where quench streams are desired to be placed along the reaction zone to temper the reaction taking place in the reaction zone. By having an input stream located at the lower portion of the reaction zone, an overall effluent at the top portion of this zone with an intermediate quench or secondary feed stream pasing into the zone at a point somewhere between the feed input and effluent output streams with catalyst flowing in a downward direction, the additional injection of the quench or secondary feed streams into the process increases the linear velocity of they hydrocarbons or fluid materials passing in an upward direction. This causes an even more likely chance that fluidization of the particles will occur since the mass velocity of the gases in the upper portion of the fluid-solid contacting zone has been increased over the mass velocity of the feeds passed into the lower portion by the additional secondary quench or feed stream injection. In order to overcome this problem in many instances it is desired to design the upper section of the fluid-solid contacting zone with a relatively larger diameter as compared to the lower section to reduce the linear velocity of upflowing fluids to thereby bring the velocity of those materials to a velocity below the incipient fluidization velocity of the solid particles in the upper portion of the fluid-solid or reaction zone. Also in some instances it is desired to design a reaction zone having tapered walls, that is walls having larger diameter at the top portion of the fluid-solid contacting zones with a relatively smaller cross-sectional area as one proceeds in a downward direction. All of the above present design difficulties in addition to hindering the passage of solid particles in a downward direction. In such designs, substantial portions of the downflowing bed of solids may not be in the main flow of upflowing fluids because of the diameter increase. In instances in which a large diameter is desired to be at the top of the fluid-solid contacting zone with a smaller diameter located on the lower portion and in instances in which the vessel is swedged or abruptly reduced, it is possible that in areas above the reduction in cross-sectional diameter that catalyst particles can get hung up or trapped thereby preventing their removal from the system.

My invention substantially prevents the problems associated with the approaching of incipient fluidization velocities in a contacting zone. My invention overcomes this problem by utilizing an essentially two-section fluid-solid contacting zone. The lower portion of my invention is a normal cylindrically shaped solid bed which flows in a downward direction. The fluids flowing into this zone to contact the particles therein and flow in an upward direction thereby rendering a true countercurrent flow. A secondary feed introduction or quench stream can be introduced above this bed and flow into an upper fluid-solid contacting zone in which the fluid flowing into this zone contact the downflowing catalyst with the fluids flowing in a sidewards direction or in a direction normal to the normal fluid direction in the lower section. Typically and preferably the upper portion of my process invention utilizes a radial flow or cross-flow reaction zone so that the fluids flowing through the upper section flow in a direction normal to the flow of fluid in the lower section. And being in a sideways direction, it is difficult for fluidization to occur. Even if fluid flow in the upper section is above the incipient fluidization velocity of the catalyst particles, the fluid flow is in a sideways direction and it cannot carry catalyst particles in an upward direction. It can only carry them against the retaining walls of the upper lateral contacting zone.

BRIEF SUMMARY OF THE INVENTION

My invention comprises a fluid-solid contacting process having a two-section fluid-solid contacting zone. The lower section of the contacting zone allows true countercurrent flow of descending solid particles with upflowing vapors. The upper lateral fluid-solid contacting zone allows the effluent from the bottom zone together with an additional feed fluid to contact downflowing solid particles in this section in a lateral direction thereby preventing the fluidization of particles within the upper portion of the fluid-solid contacting zone.

A broad embodiment of my invention resides in a fluid-solid contacting process in which solid particles are added to and withdrawn from a contacting zone, wherein the solid particles flow in a downward direction, which process comprises: (a) passing a first fluid into a lower section of said contacting zone at countercurrent contacting conditions including the upflow of said first fluid and the downflow of solids through a cylindrical bed of solids; (b) passing a second fluid together with fluid recovered from said lower section into an upper section of said contacting zone at lateral contacting conditions including the downflow of solids and the sideflow of fluids through a bed of solids; (c) recovering effluent fluid from said upper section of said contacting zone.

BRIEF DESCRIPTION OF THE DRAWING

The attached drawing shows a preferred embodiment of the process of my invention.

A contacting zone labeled 1 is shown as cylindrically shaped vessel 1. The contacting zone comprises the upper and lower sections of catalyst or solid particle beds. The lower section of contacting zone is described by solid particles located within dense bed 2. The essential configuration of the lower section of the contacting zone is a cylindrically shaped moving bed of solid particles. The moving bed has the solid particles flowing in a downward direction from the upper portion of it which is defined as screen 15 from the catalyst transfer conduits 9 into the top portion of the dense bed 2 and out of the lower section of the contacting zone via outlet conduits 5. The outlet conduits 5 can carry solid particles to a waste removal system or to a regeneration system where a portion or all of the solid particles may be regenerated and passed back into the upper section of the contacting zone via particle inlet conduits 8.

The essential flow in the lower section of the contacting zone in bed 2 is essentially countercurrent flow with the solid particles flowing in a substantially parallel and downward direction with a first fluid feed stream passing in an upward direction through the bed 2. The first fluid feed stream passes into the lower section of the contacting zone via inlet conduit 4 which can carry a fluid material (either a liquid or a gas material) into the lower section of the downflowing lower bed 2. Fluid distribution devices such as spargers or multiple inlet streams may be located in the lower section to evenly disperse the first fluid throughout the cross-sectional area of the downflowing catalyst bed 2. The first fluid which is recovered as a first effluent fluid from the downward flowing dense bed 2 passes through screen 15 and is recovered in void volume 18 located between the upper and lower sections. Void volume 18 allows a first effluent, or the effluent from the lower section which passes out of it through the screen 15, to be collected and passed through inlet 13 or conduit 6 which carries a second fluid. The second fluid is commingled with the first effluent from the lower section and eventually passes into volume 12 in the upper section of the contacting zone.

In the drawing, the upper section of the contacting zone is shown as a preferred embodiment as an annular bed of catalyst particles 3. The annular bed is formed by inner walls 19 and outer walls 10 which can comprise screens or other porous materials which can allow fluid to flow via volume 12 laterally across the dense beds 3 located in the annular particle bed, out of the bed via screens 10 and into collection volume 11 which eventually allows the total effluent from the process to be removed via effluent conduit 7. In the upper section of the contacting zone the preferred annular bed of solid particles 3 moves in a downward direction having fresh solid particles passing via particle inlet lines 8 past plate 17 which acts as the upper most boundary of this section and into the particle bed 3. Since the particles in this section flow in a downward direction, they can be removed from the upper section by particle transfer conduits 9 which can carry solid particles from the upper section into the lower section. It is preferred that the upper and lower sections be substantially sealed off by plate 16 which prevents the passage of effluent from the lower section into the upper section without bypassing the center volume 12 of the upper section.

As can be seen in observing the drawing, the gas velocity can be substantially increased in the process by the addition of a second fluid stream through conduit 6. However, the substantial increase in linear velocity of the fluids passing through volume 12 is in a horizontal direction because of use of cross-flow type of lateral contacting section in the upper section of my process. By having the fluids passing into the upper section eventually contacting solids in that section in a horizontal or sideways direction (a direction which is substantially normal for the fluid direction in the lower section) it is very difficult to have fluidization occurring since the forces acting upon the catalyst comprise the hydraulic forces which are horizontal and gravitational forces which are downward-vertical.

DETAILED DESCRIPTION OF THE INVENTION

The process of my invention is essentially a two-stage fluid-solid contacting process in which it is required that fluids and solid contact one another in a countercurrent flow fashion. It is preferable that the catalyst or solid particles which are passed into my process pass in an overall downward direction through the contacting zone of my invention. The overall flow of fluid materials into the process is in an upward direction when observing the process from the outside. As can be seen, when looking at the drawing, the lower section of the contacting zone contains a dense bed which has catalyst particles flowing in a downward direction. In this section of the contacting zone the upflowing fluid materials should be below the incipient fluidization velocity of the solid particles moving in a downward direction. As these particles flow downward with the fluids flowing upward they can contact the secondary fluid input stream or quench stream and pass into an upper section of my process. In the upper section the increased mass velocity caused by the addition of the second fluid feed stream passing into the contacting zone if the contacting zone were constructed similarly to a lower section would cause, in many instances, the velocity of the upflowing fluids to approach incipient fluidization velocity of the solid particles flowing downward, thereby causing fluidization of the downflowing solid particles. Since my invention allows a sideways flow of fluid in an upper contacting section in my contacting zone, the problems associated with the processes in which quench or secondary feed streams are passed into the midpoint of the reaction zone are eliminated.

The fluid-solid contacting process of my invention can include normal fluid-solid contacting processes in which heat exchange is desired to take place between two or more fluid feed streams and solid particles. It is even more preferable to utilize my fluid-solid contacting process as a fluid-solid contacting conversion process and even more particularly as a hydrocarbon conversion process. The process of my invention is specifically applicable to refinery processes in which quench streams or secondary feed streams are desired to pass into a reaction zone. Specific processes include hydrocracking reactions in which there is countercurrent flow of downflowing catalyst and upflowing vaporous feed stocks with a quench stream passing into a point somewhere between the feed input and effluent output in the conversion process. Additionally, my process is specifically applicable to more recent moving bed processes for producing substitute natural gas. These processes utilize vaporized naphtha together with steam to contact a suitable catalyst to cause the cracking of naphtha to methane with the coproduction of hydrogen and carbon monoxide. Additional reactions taking place in these type of processes include the water-gas shift reactions in which carbon monoxide and water are allowed to form carbon dioxide and hydrogen. Additionally, the highly exothermic methanation reaction in which carbon monoxide and hydrogen produced are eventually converted to water and methane. In these processes it is typically preferred to pass a secondary feed stream into a gasification reactor somewhere in the midpoint between the feed introduction and the effluent output streams. The secondary feed stream generally comprises steam and additional naphtha feed stock and is utilized to control the process for better product distribution and to maintain reasonable catalyst activities and lives with lower overall utilities.

In the processes for converting naphtha to substitute natural gas, relatively large superficial gas velocities occur in the reaction zones. The upper section of the contacting zone of my invention in which substantially high velocities of gaseous materials would be reached is designed to allow these materials to flow in a sideways direction so that they contact a descending catalyst stream in the direction normal to the fluid direction in the lower section of my contacting process thereby preventing, if not totally eliminating, the possibility of fluidization or hang up of downflowing catalyst particles by high velocity fluid materials.

The size of the catalyst or solid particles which can be utilized in my process can vary anywhere from 1/16 inch or smaller pills or spheres to pills or spheres having overall average diameters up to 1/8 inch or higher. Preferably, 1/16 inch or 1/8 inch solid particles are preferred.

It is preferred that the overall catalyst flow be in the downward direction although in some instances the average flow of catalyst particles may deviate slightly from a downward direction. As long as fresh catalyst or solid particles are passed into an upper section of a contacting zone and removed from a lower section of the contacting zone we shall assume that the overall flow of catalyst or solid particles shall be in a downward direction. The first and second fluid streams which are passed into the lower section and upper sections of my contacting zone respectively should generally comprise materials which when passed into the contacting zone are essentially vaporous. Because of the nature of the overall process flow, that is upflow of fluids and downflow of catalyst, vapors are preferred because the presence of liquids would hinder flow and distribution unless the fluid velocity in the lower section was sufficiently high to carry liquids in an upward manner. The feed streams which may be utilized in the process of my invention can include many type of vaporous materials or gaseous materials which are desired to be contacted with a solid particle or catalyst particle. Preferred fluids include steam when contacting or heating downwardly flowing solid particles or hydrocarbons such as light or heavy naphthas especially when utilizing these materials for production of synthetic or substitute natural gases. It is comtemplated that when hydrocarbon feed stocks are utilized they be substantially able to be vaporized when passed into the process, therefore, preheat of these streams is generally necessary when the materials originally being used are liquids. It is also contemplated that hydrocarbons may be mixed with steam or other materials which may be inert or reactant gases in order to effectuate a given process.

Countercurrent contacting conditions typically include a true net downflow of solid particles or catalyst with an overall upflow of fluids. In some instances certain portions of the solid particle bed which are maintained in a zone in which countercurrent contacting conditions occur may not pass in a downward direction, however, the substantial portion of the solid or catalyst particles in this type of contacting conditions will be in a downward direction.

Lateral contacting conditions shall include conditions in which the overall catalyst or solid particle flow is in a downward direction but the average or overall fluid vapor flow contacting the descending catalyst or solid particles is preferably in a horizontal direction. Even more preferably lateral contacting conditions shall include descending catalyst or solid particle flow with the flow of fluid vapors in a direction essentially normal to the direction of the upflowing liquids or vapors in the lower section of my contacting zone.

Lateral contacting conditions shall generally be implemented by the use of radial flow arrangement of catalyst or solid particles in the upper section of my contacting process. A radial flow design typically has the placement of two concentrically located screens in forming cylinders which are axially aligned and vertically placed. The upper and lower ends of the inner screen and the outer screen are sealed off so that the catalyst or solid particles which is present between these two screens forms a true annular bed of solid particles. In some instances it is preferred to pass effluent materials from the lower section plus a second fluid stream into the void portion within the annular bed causing the fluids to pass radially outward through the catalyst bed essentially in a horizontal direction through the outer screen to be collected in an outer ring reception volume. This outer volume can be connected to a product conduit which can pass the material recovered from the radial flow contacting zone into recovery facilities for separation or further processing. In other instances the flow of fluids through the preferred radial flow contacting zone may be in a direction opposite to that mentioned above. In these instances, the effluent from the lower section together with the second fluid feed stream will pass into an outer volume surrounding the annular bed through the annular bed towards the inner screen to be collected in the void space located at the center of the annular bed volume. The center portion of the annular bed volume is connected to an effluent conduit which effluent conduit can be utilized to remove the products from the contacting zone. When utilizing an annular flow contacting zone in the upper section the catalyst flow as shown in the drawing is substantially in a downward direction with catalyst input conduits connected to the upper portion of the annular bed allowing the same quantity of catalyst to flow into the upper section of the annular bed as the quantity of material being withdrawn from the lower portion of the annular bed when desired.

Other physical placements of the solid particles in the upper section may be used to implement the lateral contacting conditions. Included and contemplated in the upper section of my contacting zone are catalyst bed configurations which allow downflow of catalyst and side or lateral flow of fluids. Particularly, the upper-section can be constructed with two essentially parallel and flat screens sealed off from the remaining portion of the chamber. The fluid can flow through one screen into the dense bed of catalyst which flows in a downward direction out of the other screen to be recovered by an effluent conduit. In these instances the overall flow of fluid is in a lateral or horizontal direction.

In a preferred embodiment the fluid-solid contacting process of my invention can be utilized particularly in a town gas production process in which a light naphtha feed stock together with steam pass into a gasification reactor. The gasification reaction zone can be utilized as a fluid-solid contacting conversion zone of my process. In particular in the town gas production conversion reaction zone a feed naptha containing hydrogen and steam is passed into the first stage of the gasification reaction zone wherein substantial portions if not all of the naphtha are converted to methane, carbon monoxide, carbon dioxide and water with some hydrogen production. The second stage of the gasification reaction zone can be the upper section of my fluid-solid contacting zone and can receive substantially all or a part of the effluent from the lower section or the first gasification reaction zone together with a second feed stock which typically also contains hydrogen and steam along with light naphtha. The second feed together with the effluent from the lower section reaction zone all pass into the upper section or the second stage gasification reaction zone to produce a town gas which contains materials such as water vapor, carbon monoxide, carbon dioxide, hydrogen and methane.

Since the typical town gas production process requires such large reaction zone diameters and large quantities of catalyst, along with the quite large volumetric rates which pass through the reaction zone it is very possible that the incipient fluidization velocity of catalyst particles will be reached easily in the gasification process. Therefore, the two-stage flow of my process is specifically applicable to these type of processes. To those versed in the art U.S. Pat. No. 3,429,680 issued on Feb. 25, 1969, can be utilized as reference to the operating conditions catalyst and flow schemes utilized for the production of town gases by steam or reforming of hydrocarbons. In particular, light naphtha hydrocarbons can be utilized as feed stocks. It is preferred, however, that $C_2$ and $C_3$ materials be utilized as feed stock fluids. Typically, the catalyst which can be used in the process is a kieselguhr or alumina material. The catalytically active components generally utilized include nickel as much as 60 percent by weight, magnesium oxide 8–10 percent by weight and copper, chromium, and manganese whose total quantity may vary from a few per cent up to 10 per cent with molecular ratios of 1:1.

The overall process operations can be anywhere from a few to many hundred pounds per square inch. Other conditions include hydrogen to carbon mole ratio from zero to about 0.5:1 and a steam to carbon atomic ratio of about 1:1 to about 2.0:1. The operating temperatures will be greater than about 700° and less than about 1,100° F.

I claim as my invention:

1. A fluid conversion process in which first and second fluid streams are passed into a conversion zone, which zone has an upper section containing an annular shaped bed of solid catalyst particles and a lower section containing a cylindrical bed of solid catalyst particles, which upper and lower sections are connected forming a continuous zone of catalyst which process comprises:
   a. passing fresh catalyst particles into said upper section annular shaped bed of particles;
   b. removing spent solids from said lower section cylindrical bed of particles;
   c. passing a first feed stream comprising naphtha and steam into said lower section at countercurrent fluid-solid contacting conversion conditions including the upflow of fluid and the downflow of catalyst to effect the conversion of said first feed into a first effluent;
   d. passing said first effluent together with a second feed stream comprising naphtha and steam into said upper section at lateral contacting conversion conditions including the downflow of solids and the substantially horizontal flow of feed through said annular shaped bed from an inner portion radially to an outer portion of said annular bed at conditions to effect the conversion of said second feed and first effluent to a second effluent;
   e. recovering said second effluent from said upper section of said conversion zone.

2. Claim 1 in that said first and second effluents comprise hydrogen, methane, water, carbon monoxide and carbon dioxide.

* * * * *